April 14, 1953 L. S. HOUGHTON 2,634,757
LIQUID DISPENSING SOLENOID VALVE
Filed Nov. 29, 1948
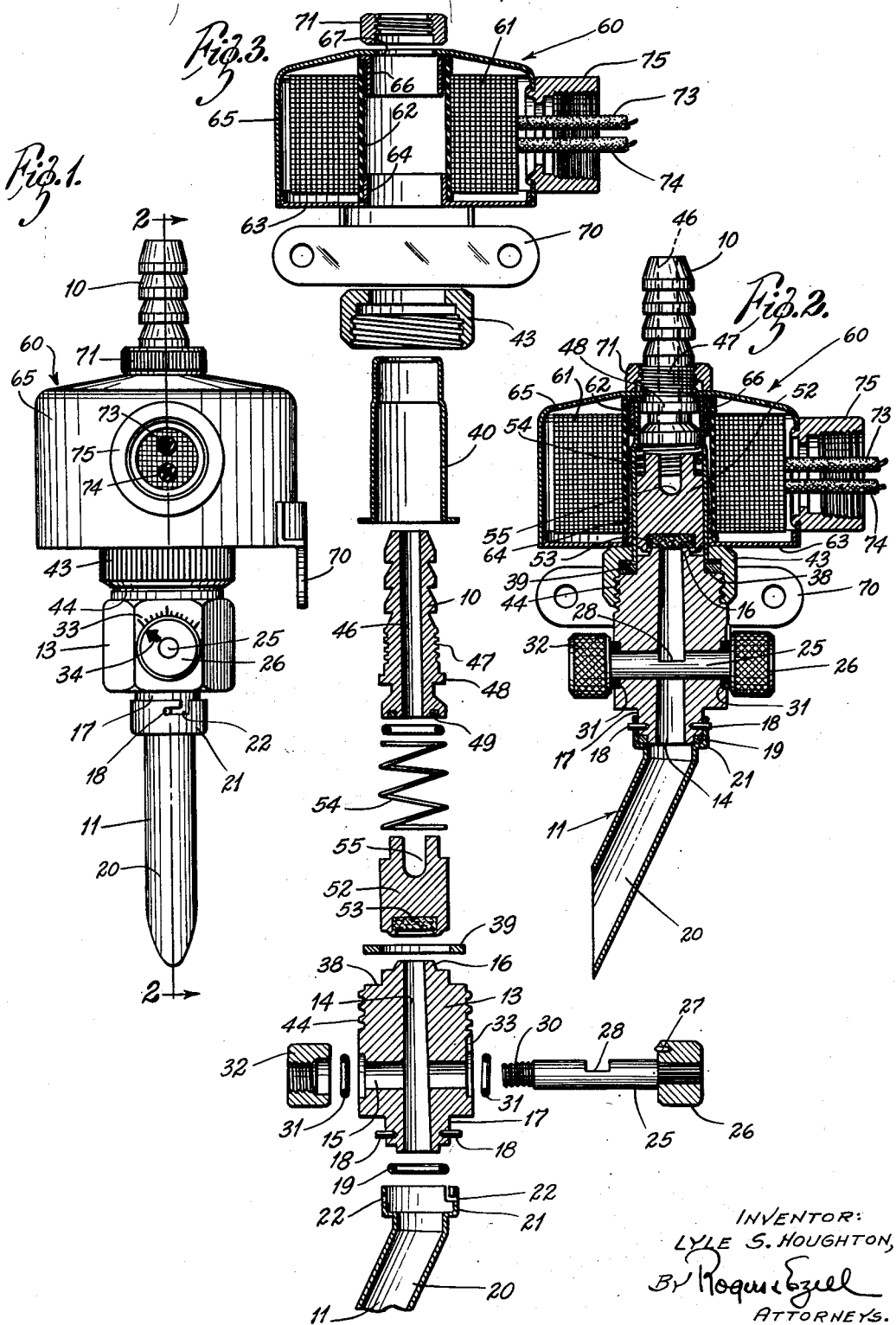
INVENTOR:
LYLE S. HOUGHTON,
BY Rogue Ezell
ATTORNEYS.

Patented Apr. 14, 1953

2,634,757

UNITED STATES PATENT OFFICE 2,634,757

LIQUID DISPENSING SOLENOID VALVE

Lyle S. Houghton, St. Louis County, Mo., assignor to Alco Valve Company, University City, Mo., a corporation of Missouri Application November 29, 1948, Serial No. 62,500

7 Claims. (Cl. 137—712)

The present invention relates to a liquid dispensing solenoid valve.

It is an object of the invention to provide a valve of the foregoing kind in which the electromagnetic parts are so distinct from the fluid valve parts that the valve parts may be removed for cleaning without disturbing the electrical connections. An especial object of the invention is to provide a valve of this kind that can be assembled and disassembled without the use of a wrench or any such tool.

In view of the fact that this valve is likely to be used with food products, it is an especial object of the invention to provide a construction than can be completely cleaned.

Specifically, it is an object of the invention to provide a valve of this kind that can be readily cleaned with an ordinary brush or spray, or the like. Also, to this end, it is an object of the invention to provide a valve that is free of recesses or pockets that cannot be easily reached for cleaning and sterilizing.

Another object of the invention is to provide a valve so constructed that all of the valve parts coming in contact with the fluids can be made of stainless steel, except for one element of the device that is made of silver. Another object is to provide a construction wherein the gaskets and similar parts will not impart any taste or odor to fluids flowing through the valve.

Another object of the invention is to provide a valve of this type that meters the amount of fluid passing through the valve; and further is to provide a valve of this kind wherein the amount of fluid may be adjusted. Specifically, it is an object to provide a metering range that is graduated and in which the chosen setting or metering position can be locked. An object of this arrangement is to permit the setting to be varied for different fluids or fluids of different viscosities or quantities, or the like.

Another object of the invention is to provide an outlet tube from the valve that can be rotated to any position without changing the mounting position or location of the outlet.

Other objects will appear from the description to follow.

In the drawings:

Fig. 1 is a side elevation of the valve construction;

Fig. 2 is a vertical, medial section taken on the line 2—2 of Fig. 1; and

Fig. 3 is an exploded sectional view of the valve.

In general, the valve includes an inlet 10 at the top of the structure and an outlet 11 at the bottom of the structure. Between the inlet and the outlet, there are located the solenoid parts, the valve parts, including a fluid casing, a valve plunger, a valve seat body, and the metering parts.

At the lower part of the valve assembly, there is a valve seat and metering block or member 13. This member has a passage 14 that extends vertically through it, and which is intersected by a transverse opening 15. The top of the passage 14 terminates in a valve seat 16. The bottom of the passage 14 opens through the bottom of the block 13. The lower part of the body member 13 is somewhat reduced in size to provide a cylindrical portion 17 from which two bayonet joint pins 18 project. The bottom of this cylindrical portion 17 is further reduced so as to receive a packing ring 19.

The outlet 11 includes the passage 14, preferably supplemented by a bent spout tube 20, as indicated. The upper end of this tube 20 is flared out, as at 21, and is provided with bayonet joint slots 22. By this arrangement, the spout 20 may have its upper cylindrical portion slipped over the cylindrical portion 17 on the valve body 13, with the slots 22 locked over the pins 18 and with the packing washer 19 interposed between to give a tight fit. Also, the spout 20 may be easily turned to the opposite direction by reversing the respective positions of the slots 22 with respect to the two pins 18.

As noted, the passage 14 is part of the outlet passage from the valve seat 16. The intersecting transverse opening 15 receives a metering device that regulates the flow through the passage 14. There is a metering screw or pin 25 that is inserted through the opening 15. At one end, this metering pin has a knurled head 26 on it, on the inner face of which there is a short pin 27 that locks the metering screw in adjusted position. The metering screw has a metering notch 28 midway of its length that is adapted to register with the passage 14 when the metering screw is fully inserted into the opening 15. The metering pin passes through the opening 15 and has a threaded end 30 projecting beyond the body member 13. On the opposite ends of the transverse opening 15, the body member is undercut to receive removable packing rings 31; and another knurled nut 32 is adapted to thread onto the threaded projection of the metering screw 30. The housing has a plurality of radial indentations 33 adjacent one end of the opening 15, that are engageable with the pin 27 on the head 26 of the metering pin 25, for the purpose of holding the pin and thereby holding the metering screw against accidental movement, and also of indicating the position of the valve. As shown in Fig. 1, the head 26 has an index 34 on it to register with the indentations 33 that thereby form graduations, or which may be independently marked as desired.

It will be seen that, when the metering screw is disposed in position and the locking nut 32 is not tight, but is loose enough to permit some axial displacement of the metering screw, the screw may be turned to dispose the pin 27 in some suitable indentation 33. Thereafter, the nut 32 may be tightened up which will firmly secure the metering screw in its adjusted position. This action also tightens the packing rings 31 to provide a fluid tight seal.

The valve body 13 is reduced at its upper end to provide a shoulder 38. This shoulder receives a washer 39, and above the washer it receives a tubular sleeve-like member 40 that is flanged at its lower end so as to be engaged against the washer 39 and the shoulder 38, such as is indicated in Fig. 2. A union nut 43 is adapted to slip down over the tubular element 40, to fit against the flange thereon and to engage threads 44 on the valve body 13 so as to firmly attach the tubular member 40 to the valve body 13.

Prior to the assembly of the tubular member in the manner just indicated, the inlet 10, having the shape shown, is inserted into the tubular member 40. This inlet member has a passage 46 through it with the outer part of the upper end preferably shaped as shown so as to receive a hose connection or the like. The mid-portion of the inlet 10 is threaded as at 47. Below the threads, there is a flange 48. Below the flange 48, the inlet 10 flares outwardly somewhat and presents a square bottom surface that has a circular groove 49 therein. This groove is filled with silver so as to form a shading ring for purposes to appear.

As shown in Fig. 2, the inlet 10 is inserted upwardly in the tubular member 40. The upper part of the tubular member 40 is somewhat reduced in size so as to fit tightly with the inlet member, and the top edge of the tubular member 40 is inturned to provide a flange that will cooperate with the flange 48 on the inlet member.

Also, within the tubular member but below the inlet, there is a combination magnetic plunger and valve member 52 that has a valve seat disc 53 in its bottom surface to cooperate with the valve seat 16 in the body member 13. This member or plunger 52 is non-circular in section so that fluid may pass around its sides. A hexagonal section is suitable for this purpose. Its upper end is somewhat reduced in diameter to provide a shoulder for a coil spring 54 that is disposed between the bottom of the inlet fitting 10 and the shoulder to urge the plunger 52 downwardly to close the valve. Also, the upper end of the valve plunger 52 has a notch 55 cut in it to facilitate the flow of fluid through the passage 46 of the inlet to the passages beside the plunger, and to insure that there will be flow when the valve is upwardly and perhaps in engagement with the bottom of the inlet.

There is a solenoid assembly generally indicated at 60. This includes a coil 61 that is wound around a sleeve 62. There is a lower disc 63 that has an upwardly extending flange 64 against which the sleeve 62 may fit. A casing 65 encloses the coil and is cup-shaped so as to close with the bottom disc 63. At the top, the casing has secured to it a flange 66 that slips down on the inside of the sleeve 62. There is an opening 67 in the top of the casing 65 so that this coil assembly may be inserted over the inlet 10. An attaching bracket 70 may be provided on the casing 65 for the obvious purposes.

The assembly 60 is inserted over the tubular member 40, and a nut 71, that is engageable with the threads 47 on the inlet member 10, is employed to secure the parts together. There are leads 73 and 74 that are adapted to be connected to a suitable power source for energizing the coil 61. Most desirably, these leads lead out of a threaded fitting 75.

In the use of this valve, the fitting 10 is connected to a flexible tube in the ordinary construction of such a food dispensing device as a coffee dispenser. When the coil 61 is deenergized, the plunger 52 is in its lower position so that the valve disc 53 engages the valve seat 16 on the housing 13 to disestablish communication from the inlet of the passage 14 in the valve body. When it is desired to dispense from the valve, the coil 61 is energized so that it draws the core 52 upwardly against the spring 54, and usually into engagement with the bottom of the inlet fitting 10. The liquid then flows from the inlet through the notch 55 and down the outer surface of the block 52, past the valve seat 16 and into the passage 14. The metering screw is adjusted to some position other than that shown in Fig. 2 so that a certain amount of this liquid can pass through the metering notch 28 and ultimately into the outlet 11. After a suitable amount of liquid has been dispensed, the coil is again deenergized so that the spring 54 causes the plunger 52 to descend and close the valve. In the operation of the solenoid coil, the shading ring 49 acts in the usual manner.

When the valve is assembled, the tubular member 40 provides the valve chamber, that is closed at the top by the inlet fitting, and closed at the bottom by the valve body member 13. The inlet 46 is through the inlet fitting 10, to the valve chamber within the tube 40, and to the valve seat 16. The outlet includes the passage 14 that contains the metering device, and includes also the spout 20, that normally is used with the valve.

This valve lends itself to very easy and complete cleaning. The valve parts are completely separable from the coil assembly. When the union nut 43 is unscrewed from the valve body 13, the valve body may be withdrawn and the valve plunger 52 and spring 54 will go with it. This permits complete cleaning of the spring and the plunger 52, and the complete cleaning of the sleeve 40, as well as the inlet fitting 10. The sleeve 40 and inlet fitting that remain attached to the solenoid assembly can be cleaned by a brush very readily.

In any assembly of the valve, the nozzle may be pointed in any direction by loosening the union nut 43 and twisting the valve body 13.

In order to clean the valve body, the nut 32 may be removed from the metering screw and that screw withdrawn so that it and the opening 15 may be completely cleaned. When the pin 25 is removed, the outlet passage 14 may be cleaned. It is preferable to clean this somewhat tapering passage from below and to do this the nozzle or outlet 11 may be removed by its bayonet connection.

Additionally, the inlet fitting may be removed after the union nut 43 is detached by loosening the nut 71, so that the inlet fitting 10 may be dropped downwardly through the solenoid assembly.

It will be obvious that the reassembly of the parts is very simple. This assembly factor also aids in the manufacture of the valve.

The fluid containing parts of the valve are well sealed off. The lower portion of the inlet fitting 10 is the only portion thereof, except for the passage 46, that is subjected to the fluid. The tubular element 40 limits the passage of the fluid to the somewhat enlarged portion of the tubular member 40 down to the valve seat.

The shading ring 49 acts in the obvious manner, but, as it is made of silver, it can be easily cleaned, and maintained sanitary. All of the parts of the valve that are exposed to the food preferably are made of stainless steel, so that they can be kept entirely sanitary.

The threaded parts are shown as having acme threads. This aids in permitting the valve to be readily assembled and disassembled, and it aids in permitting the use of knurling on the outside of the nuts 43 and 71 so that they may be released by hand, rather than by tools.

It will be seen that this valve has outstanding advantages from the standpoint of use in connection with food, and that, even in connection with other uses, it has distinct advantages of simplicity of construction, assembly and disassembly.

What is claimed is:

1. In a valve construction, a coil assembly having a central opening, a casing removably mounted in the opening in the coil assembly and having a valve chamber therein, the chamber being open at one end, and its wall extending from the open end smoothly without pockets so that the valve chamber may be cleaned with a brush or the like inserted into the open end, a fluid flow passage leading into the chamber, means removably engaged with the open end of the casing, and closing the same, said removable means having a second fluid passage therethrough leading to said chamber and a valve seat at the inner end of said second passage, said second passage being sufficiently straight and devoid of shoulders so that it may be easily cleaned by a brush or the like, and a valve in the valve chamber cooperable with the valve seat.

2. In a valve construction, a coil assembly having a central opening, a casing removably mounted in said opening and having a valve chamber therein, the chamber being open at one end, and its walls extending from the open end smoothly without pockets so that the valve chamber may be cleaned with a brush or the like inserted into the open end, an inlet member removably fastened to the casing and containing a first fluid flow passage having a smooth inner wall devoid of shoulders and pockets leading into the chamber, means removably fastening together the coil assembly, the casing, and the inlet member, means removably engaged with the open end of the casing, and closing the same, said removable means having a second fluid passage therethrough leading to said chamber and a valve seat at the inner end of said second passage, said second passage being sufficiently straight so that it may be cleaned by a brush or the like, and a valve in the valve chamber cooperable with the valve seat, the first fluid passage extending from the valve chamber opposite the open end thereof to enable it to be cleaned by a brush or the like inserted through the open end of the valve chamber.

3. A valve construction comprising a tubular casing having a shoulder at one end and a flange at the other end, a fluid passage fitting having an axial passage therethrough, and an enlarged end, insertable through the flanged end of the casing to project from the opposite end, with its enlarged end stopped against the shoulder of the casing, a support through which the projecting fitting extends, an element removably engageable with the fitting beyond the support to hold the fitting against the casing shoulder, and to hold the casing to the support, a valve seat body engageable with the flanged end of the casing, and having a valve seat positioned in the casing, removable means to hold the valve seat body on the casing, the valve seat body having a fluid passage through the valve seat, and a valve in the casing cooperable with the valve seat.

4. A valve construction comprising a tubular casing having a shoulder at one end and a flange at the other end, a fluid passage fitting having an axial passage therethrough, and an enlarged end, insertable through the flanged end of the casing to project from the opposite end, with its enlarged end stopped against the shoulder of the casing, a support through which the projecting fitting extends, an element removably engageable with the fitting beyond the support to hold the fitting against the casing shoulder, and to hold the casing to the support, a valve seat body engageable with the flanged end of the casing, and having a valve seat positioned in the casing, removable means to hold the valve seat body on the casing, the valve seat body having a fluid passage through the valve seat, and a valve in the casing cooperable with the valve seat, the removable means for holding the valve seat body comprising a union nut engageable over the flange of the casing, and threadably interengageable with the valve body.

5. A valve construction comprising a tubular casing having a shoulder at one end and a flange at the other end, a fluid passage fitting having an axial passage therethrough, and an enlarged end, insertable through the flanged end of the casing to project from the opposite end, with its enlarged end stopped against the shoulder of the casing, a support through which the projecting fitting extends, an element removably engageable with the fitting beyond the support to hold the fitting against the casing shoulder, and to hold the casing to the support, a valve seat body engageable with the flanged end of the casing, and having a valve seat positioned in the casing, removable means to hold the valve seat body on the casing, the valve seat body having a fluid passage through the valve seat, and a valve in the casing cooperable with the valve seat, the removable means for holding the valve seat body comprising a union nut engageable over the flange of the casing, and threadably interengageable with the valve seat body, the passage in the valve seat body being substantially rectilinear, and an adjustable metering device removably mounted in the body and intersecting said second fluid passage to regulate the size of the passage.

6. A valve construction comprising a tubular casing having a shoulder at one end and a flange at the other end, a fluid passage fitting having an axial passage therethrough, and an enlarged end, insertable through the flanged end of the casing to project from the opposite end, with its enlarged end stopped against the shoulder of the casing, a support through which the projecting fitting extends, an element removably engageable with the fitting beyond the support to hold the fitting against the casing shoulder, and to hold the casing to the support, a valve seat body engageable with the flanged end of the casing, and having a valve seat positioned in the casing, removable means to hold the valve seat body on the casing, the valve seat body having a fluid passage through the valve seat, and a valve in the casing cooperable with the valve seat, the removable means for holding the valve seat body comprising a union nut engageable over the flange of the casing, and threadably interengageable with the valve seat body, the passage in the valve seat body being substantially rectilinear, and an adjustable metering device removably mounted in the body to regulate the size of the passage, the metering device comprising an opening in the body intersecting the passage therethrough, a metering pin insertable into the opening, the metering pin having a shape where it intersects the passage, that obstructs the passage in amounts varying with the rotated position of the pin in its opening, means to hold the pin against rotative movement, said means being releasable by axial displacement of the pin, and means holding the pin against axial displacement.

7. In a valve construction, a body member having a substantially straight opening therethrough terminating at a first end in a valve seat, a shoulder on the body member around the valve seat, a tubular casing having a flange at one end, to be seated on the shoulder, a union nut engageable over the casing from its other end and engageable against the flange, and extending around the same to thread with the body member and removably attach the body member to the casing, the casing having an inturned end at its end opposite the flange, a shouldered inlet fitting insertable through the flanged end of the casing, to project beyond the other end and to engage its shoulder against the inturned end of the casing, a core axially movable in the casing to and from the valve seat, a coil assembly having a central opening, the assembly being mounted over the casing, and over the inlet fitting, a nut threadable over the inlet fitting to removably secure the casing and attached parts to the core assembly, and an outlet spout removably secured to the bottom of the body member, the inlet fitting having an inlet passage coaxial with the tubular casing and the passage through the body member.

LYLE S. HOUGHTON.

References Cited in the file of this patent

UNITED STATES PATENTS

| Number | Name | Date |
|---|---|---|
| 1,165,940 | Busch | Dec. 28, 1915 |

FOREIGN PATENTS

| Number | Country | Date |
|---|---|---|
| 216,810 | Switzerland | of 1942 |
| 566,211 | Great Britain | of 1944 |